(12) United States Patent
Felstaine et al.

(10) Patent No.: US 9,794,187 B1
(45) Date of Patent: Oct. 17, 2017

(54) SYSTEM, METHOD, AND COMPUTER PROGRAM FOR RESOURCE CONVERSION IN A NETWORK FUNCTION VIRTUALIZATION (NFV) BASED COMMUNICATION NETWORK

(71) Applicant: Amdocs Software Systems Limited, Dublin (IE)

(72) Inventors: Eyal Felstaine, Hertzeliya (IL); Ofer Hermoni, Yavne (IL); Nimrod Sandlerman, Ramat-Gan (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 154 days.

(21) Appl. No.: 14/572,735

(22) Filed: Dec. 16, 2014

Related U.S. Application Data

(60) Provisional application No. 61/918,597, filed on Dec. 19, 2013, provisional application No. 61/941,380, filed on Feb. 18, 2014.

(51) Int. Cl.
*G06F 15/173* (2006.01)
*H04L 12/911* (2013.01)
*H04L 29/08* (2006.01)

(52) U.S. Cl.
CPC .............. *H04L 47/70* (2013.01); *H04L 67/10* (2013.01)

(58) Field of Classification Search
CPC ............ G06F 11/1464; G06F 2201/84; G06F 11/0709; G06F 11/1451; G06F 11/079; G06F 11/20; H04L 67/1095; H04L 49/35; H04L 49/356; H04L 41/0806; H04L 49/1515; H04L 49/70; H04L 67/1097; H04L 67/42; H04L 69/40
See application file for complete search history.

(56) References Cited

U.S. PATENT DOCUMENTS

| | | |
|---|---|---|
| 6,345,239 B1 | 2/2002 | Bowman-Amuah |
| 6,427,132 B1 | 7/2002 | Bowman-Amuah |
| 6,611,867 B1 | 8/2003 | Bowman-Amuah |

(Continued)

FOREIGN PATENT DOCUMENTS

| | | |
|---|---|---|
| WO | 01/07170 A1 | 2/2001 |
| WO | 01/16849 A2 | 3/2001 |

(Continued)

*Primary Examiner* — Arvin Eskandarnia
*Assistant Examiner* — Thao Duong
(74) *Attorney, Agent, or Firm* — Zilka-Kotab, PC

(57) ABSTRACT

A system, method, and computer program product are provided for resource conversion in network function virtualization based networks. In use, a first resource of a first type is identified in a first hardware unit, the first resource at least potentially having insufficient availability and being associated with a Network Function Virtualization based (NFV-based) communication network. Additionally, a second resource of a second type is identified, the second resource being associated with the first hardware unit, the second resource being identified as sufficiently available. Further, a third resource of the first type is identified, the third resource being associated with a second hardware unit, the second hardware unit being associated with the second resource, the third resource being identified as sufficiently available.

3 Claims, 13 Drawing Sheets

(56) References Cited

U.S. PATENT DOCUMENTS

| | | |
|---|---|---|
| 6,629,081 B1 | 9/2003 | Cornelius et al. |
| 6,983,037 B2 | 1/2006 | Argo |
| 7,069,234 B1 | 6/2006 | Cornelius et al. |
| 7,167,844 B1 | 1/2007 | Leong et al. |
| 7,610,233 B1 | 10/2009 | Leong et al. |
| 7,860,232 B2 | 12/2010 | Huang |
| 8,023,425 B2 | 9/2011 | Raleigh |
| 8,023,494 B2 | 9/2011 | Takeda |
| 8,166,176 B2 | 4/2012 | Kumar et al. |
| 8,229,812 B2 | 7/2012 | Raleigh |
| 8,250,207 B2 | 8/2012 | Raleigh |
| 8,270,310 B2 | 9/2012 | Raleigh |
| 8,270,952 B2 | 9/2012 | Raleigh |
| 8,321,526 B2 | 11/2012 | Raleigh |
| 8,326,958 B1 | 12/2012 | Raleigh |
| 8,331,901 B2 | 12/2012 | Raleigh |
| 9,384,028 B1 | 7/2016 | Felstaine et al. |
| 2008/0095138 A1 | 4/2008 | Wu et al. |
| 2010/0085914 A1 | 4/2010 | Kunniyur et al. |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0246669 A1* | 10/2011 | Kanada ................. G06F 9/4856 709/238 |
| 2012/0088470 A1 | 4/2012 | Raleigh |
| 2012/0089845 A1 | 4/2012 | Raleigh |
| 2012/0134291 A1 | 5/2012 | Raleigh |
| 2012/0195206 A1 | 8/2012 | Raleigh |
| 2012/0195222 A1 | 8/2012 | Raleigh |
| 2012/0195223 A1 | 8/2012 | Raleigh |
| 2012/0196565 A1 | 8/2012 | Raleigh |
| 2012/0197792 A1 | 8/2012 | Raleigh |
| 2012/0201133 A1 | 8/2012 | Raleigh |
| 2012/0203677 A1 | 8/2012 | Raleigh |
| 2012/0208496 A1 | 8/2012 | Raleigh |
| 2012/0209750 A1 | 8/2012 | Raleigh |
| 2012/0210391 A1 | 8/2012 | Raleigh |
| 2012/0214441 A1 | 8/2012 | Raleigh |
| 2012/0222041 A1* | 8/2012 | Sabin ................. H04L 67/1008 718/105 |
| 2013/0166703 A1* | 6/2013 | Hammer ............... H04L 41/50 709/220 |
| 2013/0182714 A1* | 7/2013 | Vachharajani .......... H04L 45/44 370/400 |
| 2013/0311988 A1* | 11/2013 | Boss .................... G06F 9/4862 718/1 |

FOREIGN PATENT DOCUMENTS

| | | |
|---|---|---|
| WO | 01/17169 A2 | 3/2001 |
| WO | 01/17313 A1 | 3/2001 |
| WO | 01/46846 A2 | 6/2001 |
| WO | 01/46889 A2 | 6/2001 |
| WO | 2010/088072 A1 | 8/2010 |
| WO | 2010/088073 A1 | 8/2010 |
| WO | 2010/088074 A1 | 8/2010 |
| WO | 2010/088075 A1 | 8/2010 |
| WO | 2010/088076 A1 | 8/2010 |
| WO | 2010/088080 A1 | 8/2010 |
| WO | 2010/088081 A1 | 8/2010 |
| WO | 2010/088082 A1 | 8/2010 |
| WO | 2010/088083 A1 | 8/2010 |
| WO | 2010/088085 A1 | 8/2010 |
| WO | 2010/088086 A1 | 8/2010 |
| WO | 2010/088087 A1 | 8/2010 |
| WO | 2010/088094 A1 | 8/2010 |
| WO | 2010/088095 A1 | 8/2010 |
| WO | 2010/088096 A1 | 8/2010 |
| WO | 2010/088097 A1 | 8/2010 |
| WO | 2010/088098 A1 | 8/2010 |
| WO | 2010/088100 A1 | 8/2010 |
| WO | 2010/088101 A1 | 8/2010 |
| WO | 2011/053858 A1 | 5/2011 |

* cited by examiner

SYSTEM, METHOD, AND COMPUTER PROGRAM FOR RESOURCE CONVERSION IN A NETWORK FUNCTION VIRTUALIZATION (NFV) BASED COMMUNICATION NETWORK

CLAIM OF PRIORITY AND RELATED APPLICATIONS

This application claims the benefit of: U.S. Provisional Application No. 61/918,597, filed Dec. 19, 2013; and U.S. Provisional Application No. 61/941,380, filed Feb. 18, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently. The flexibility of the NFV-based network enhances the means available for optimizing the network's capacity and performance.

Very generally speaking, optimizing a communication network is based on two main considerations. First, the service should be provided closest to the subscriber to reduce long haul traffic. Second, processing, storage and similar resources should be centralized to enable efficient usage and distribution among subscribers.

These considerations are obviously contradictory, and optimization means balancing between them. The balance is based on the cost and the profit associated with each of the considerations. The cost and the profit are varying continuously and may be different for different services and for different customers. It is noted that there are further considerations associated with particular services. This makes the optimization of the NFV-based network a complex and perpetual task.

Unlike a legacy network, the NFV-based network has two topologies: the topology of the hardware devices, and the topology of the VNFs (the distribution of VNFs among the hardware devices). Another benefit of the NFV-based network is that modifying the software topology (the distribution of VNFs among the hardware devices) is much less costly than any modification of the hardware topology. However, any modification of the network has its cost, including the cost of making such modification possible (such as maintaining excess resources of intermediating operations and session continuity). It is also noted that NFV-based network enables flexibility of the fail-safe network design and reducing the cost of providing redundancy.

There is thus a need for addressing these and/or other issues associated with the prior art.

SUMMARY

A system, method, and computer program product are provided for resource conversion in network function virtualization based networks. In use, a first resource of a first type is identified in a first hardware unit, the first resource at least potentially having insufficient availability and being associated with a Network Function Virtualization based (NFV-based) communication network. Additionally, a second resource of a second type is identified, the second resource being associated with the first hardware unit, the second resource being identified as sufficiently available. Further, a third resource of the first type is identified, the third resource being associated with a second hardware unit, the second hardware unit being associated with the second resource, the third resource being identified as sufficiently available.

DETAILED DESCRIPTION

Figure 1:
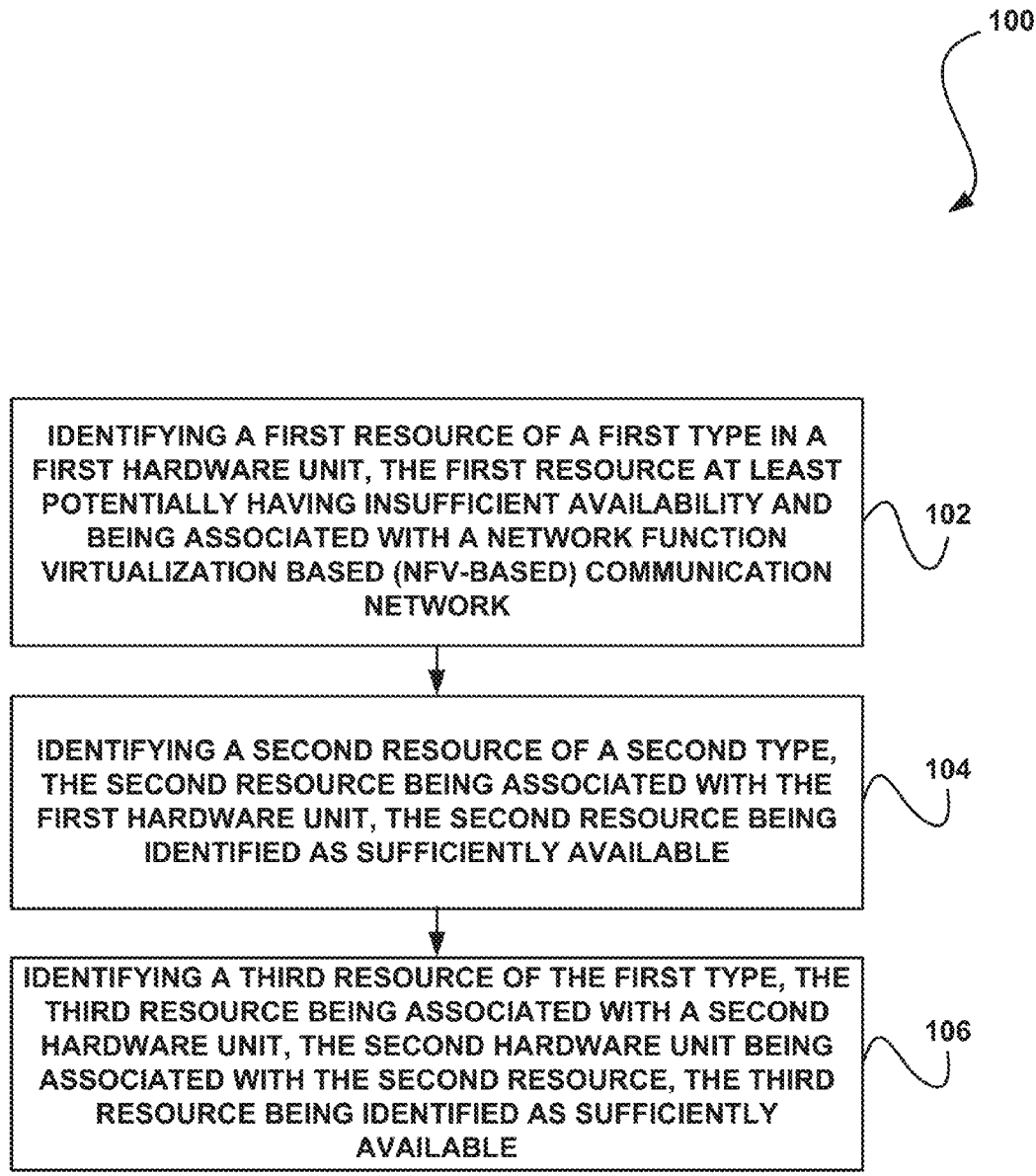
FIG. 1 illustrates a method for resource conversion in an NFV-based communication network, in accordance with one embodiment.

FIG. 1 illustrates a method 100 for resource conversion in an NFV-based communication network, in accordance with one embodiment.

As shown, a first resource of a first type is identified in a first hardware unit, the first resource at least potentially having insufficient availability and being associated with a Network Function Virtualization based (NFV-based) communication network. See operation 102. The first resource may be being used by a virtual network function (VNF) instance.

Further, a second resource of a second type is identified, the second resource being associated with the first hardware unit, the second resource being identified as sufficiently available. See operation 104. For example, the second resource may be identified as being sufficiently available to the VNF instance using the first resource, etc.

Additionally, a third resource of the first type is identified, the third resource being associated with a second hardware unit, the second hardware unit being associated with the second resource, the third resource being identified as sufficiently available. See operation 106. For example, the third resource may be identified as being sufficiently available to the VNF instance using the first resource, etc.

In one embodiment, the method 100 may further include using the second resource to provide the third resource to a VNF and/or VNF instance using the first hardware unit. Additionally, the method 100 may include migrating a VNF and/or VNF instance using the first resource to use the third resource. In this case, the migration does not deteriorate a service provided by the VNF. Also, the migration preserves service continuity provided by the VNF.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that an NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breach or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for managing VNF hierarchy and optimization in an NFV-based network according to various embodiments may be further understood with reference to the following drawings and accompanying description.

Figure 2:
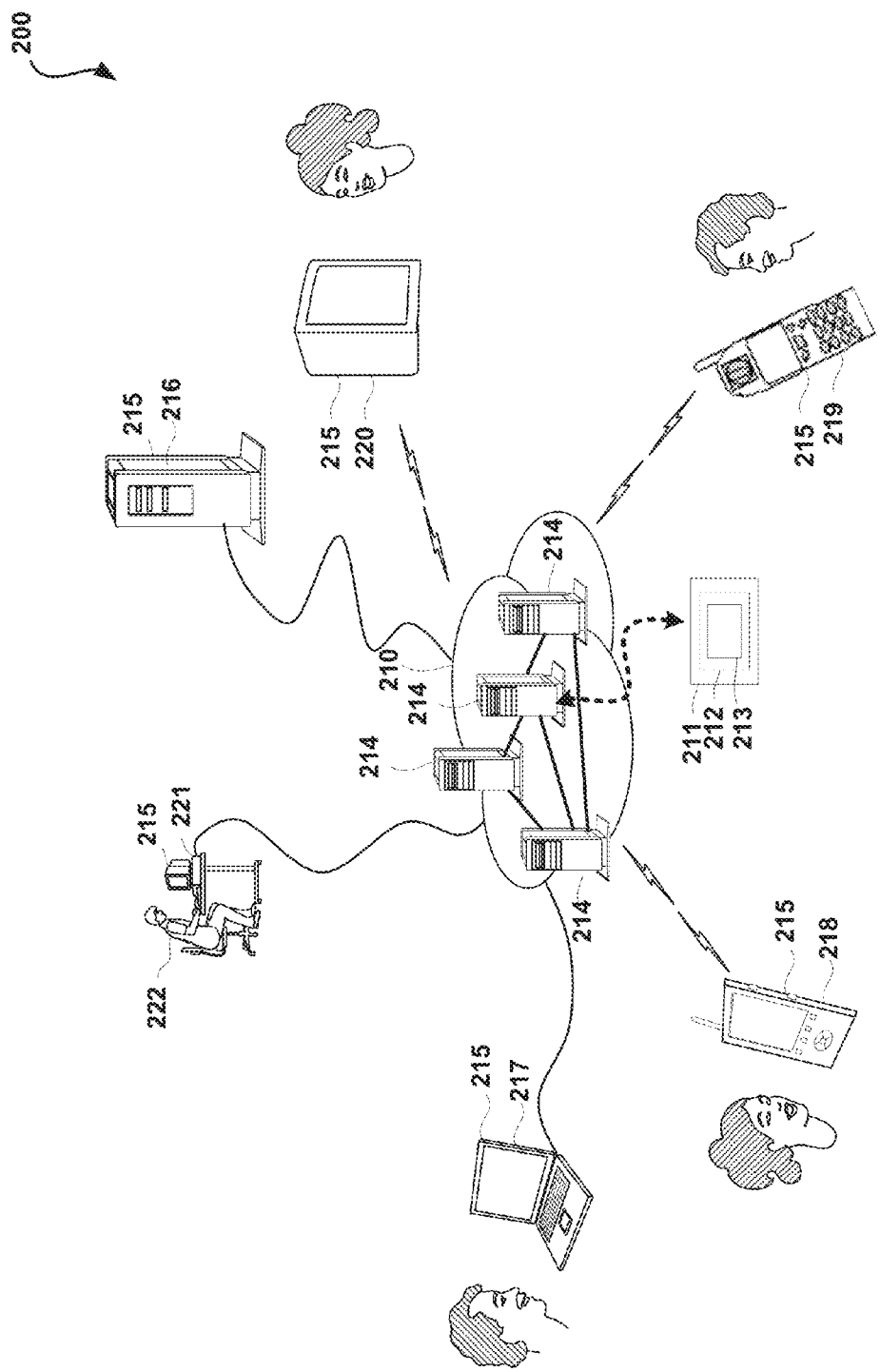
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a deployment optimization module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the deployment optimization module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The deployment optimization module 213 may be a part or a component of the NFV-O module 212. However, the deployment optimization module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the deployment optimization module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the deployment optimization module 213.

Figure 3:
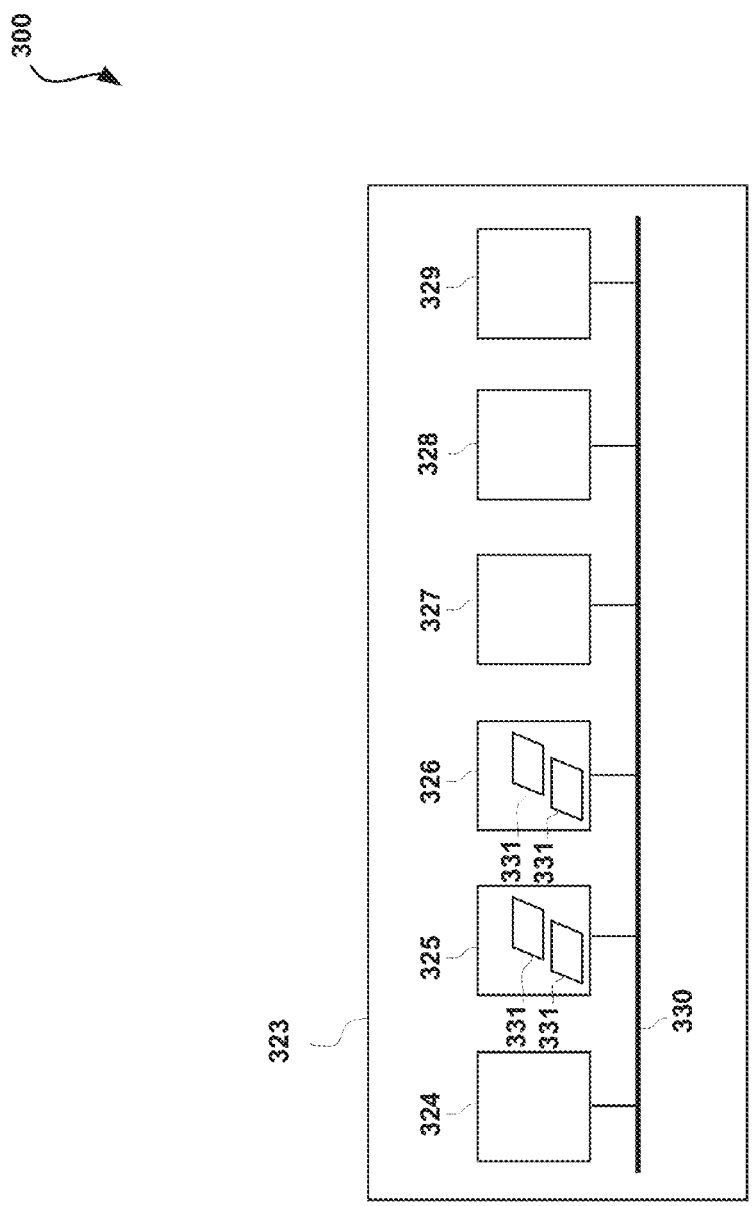
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the deployment optimization module 213 of FIG. 2.

Figure 4:
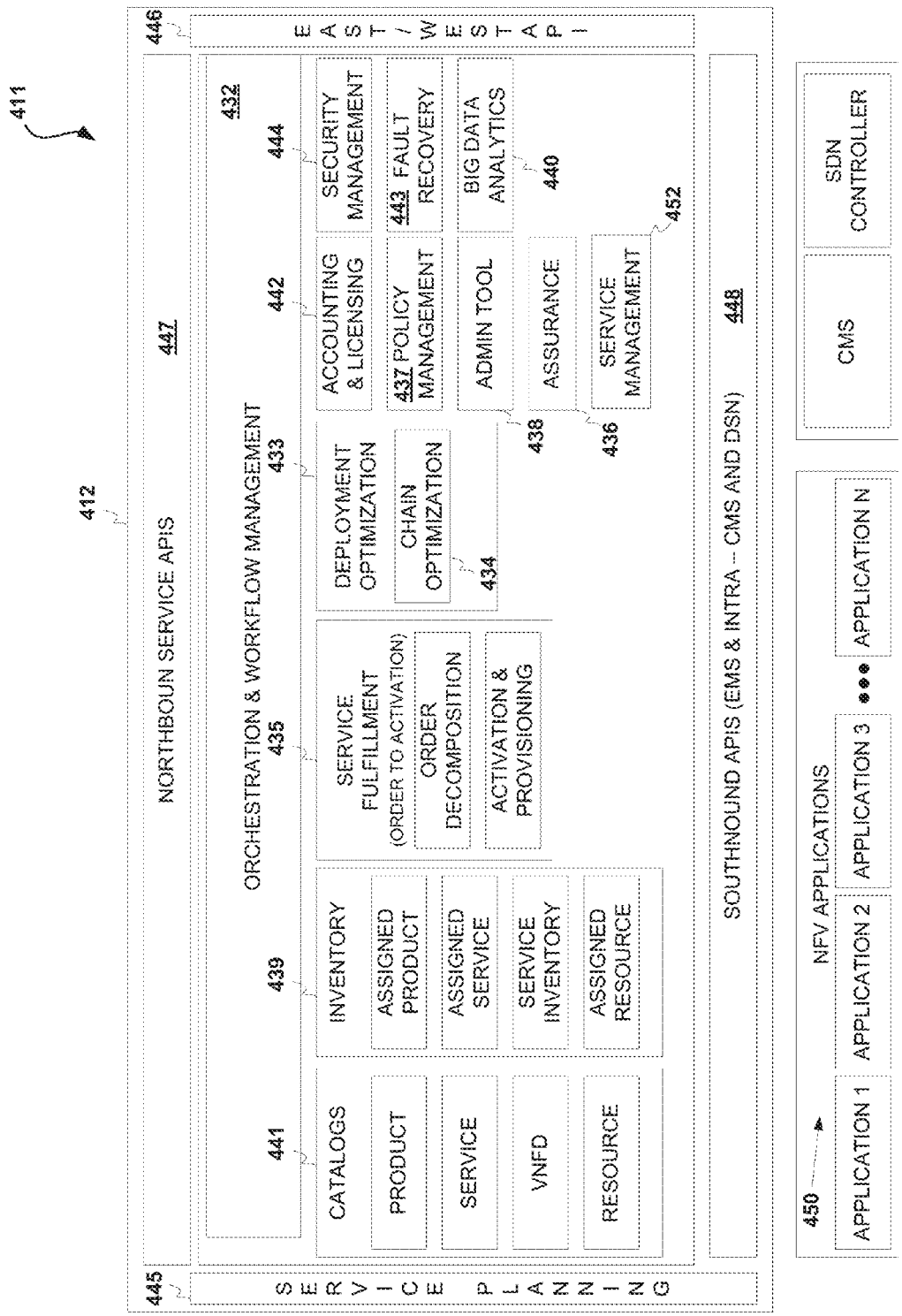
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The Network Function Virtualization (NFV) dissociates the network function, from the network hardware, by using generic processing devices, such as hardware units, and by implementing the network functions in software, such as VNFs and their VNF instances of, which can be executed by any generic processing device. Thus, while a legacy network is established by placing dedicated hardware elements according to an optimized configuration, the NFV-based network is optimized by moving VNF instances between hardware units. As moving a piece of software from one processor to another is almost instantaneous, optimization is a much more dynamic process in an NFV-based network than in a legacy network. It is also noted that in many cases the software, that is a VNF, is already available in the target device, and only needs activation (as a VNF instance) with the appropriate parameters.

The deployment optimization module 433 is used to plan the deployment of VNFs and their VNF instances within a hardware unit of the NFV-based communication network. Furthermore, deployment optimization module 433 is used to optimize the deployment of VNFs and their VNF instances. Even further, the deployment optimization module 433 is used to plan the hierarchical structure of VNFs and their VNF instances so that on-the-fly, and/or real-time optimization is possible. The deployment plans and the ongoing optimizations and changes to the deployments plans are typically implemented by the orchestration and workflow management 432. However, optionally, the deployment optimization module 433 may manage the deployment and activation of VNFs and VNF instances.

One aspect of the optimization process in an NFV-based network is that it is based on real-time needs, rather than long-term, statistically anticipated, needs. The only limitation on network reconfiguration in NFV-based network is that it does not result in a deterioration of any of the current services. However, in a situation of shortage in resources, the optimization process may prioritize services according to agreed-upon QoS (quality of service) and SLA (service level agreement) to determine particular limitations on particular services rendered to particular customers to preserve QoS and/or SLA for other services or customers.

The deployment optimization module 433 plans migration of services between hardware units, VNFs, and VNF instances in real-time, without affecting the availability of a service, and while securing service and session continuity.

According to one embodiment, optimizing the deployment of an NFV-based a communication network is based on three main considerations. First, the service should be provided closest to the subscriber to reduce long haul traffic. Second, processing, storage and similar resources should be centralized to enable efficient usage and distribution among subscribers. Third, cost, including cost of operation (such as the cost of energy if different between sites), and the cost of redeployment.

The first two considerations are obviously contradictory, and optimization means balancing between them. The balance may be based on the cost and the profit associated with each of the considerations. The cost and the profit are varying continuously and may be different for different services and for different customers. It is noted that there are further considerations associated with particular services. This makes the optimization of the in NFV-based network a complex and perpetual task.

Unlike a legacy network, the NFV-based network has two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (the distribution of VNFs among the hardware devices) is much less costly than any modification of the hardware topology. However, any modification of the network has its cost, including the cost of making such modification possible (such as maintaining excess resources of intermediating operations). It is also noted that NFV-based network enables flexibility of the fail-safe network design and reducing the cost of providing redundancy.

According to one embodiment, the method of optimizing the distribution of VNFs comprises moving VNFs up and down the network hierarchy (as well as sideways) to make more efficient use of the hardware resources, and/or to reduce long-haul traffic, while maintaining the quality of the services provided (QoS, SLA) and the network resilience.

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
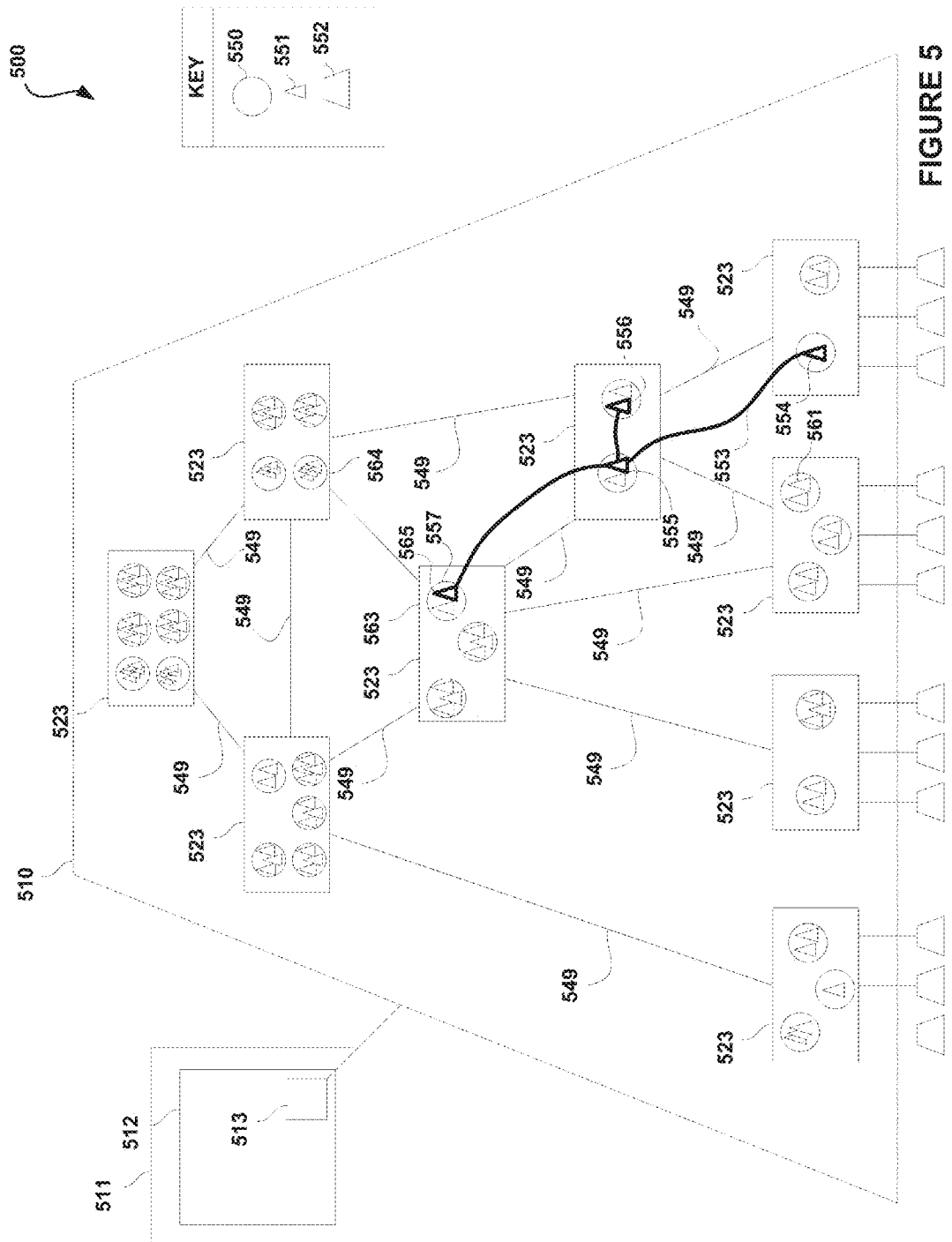
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include an NFV management system 511, an NFV-orchestration (NFV-O) 512, and a deployment optimization module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
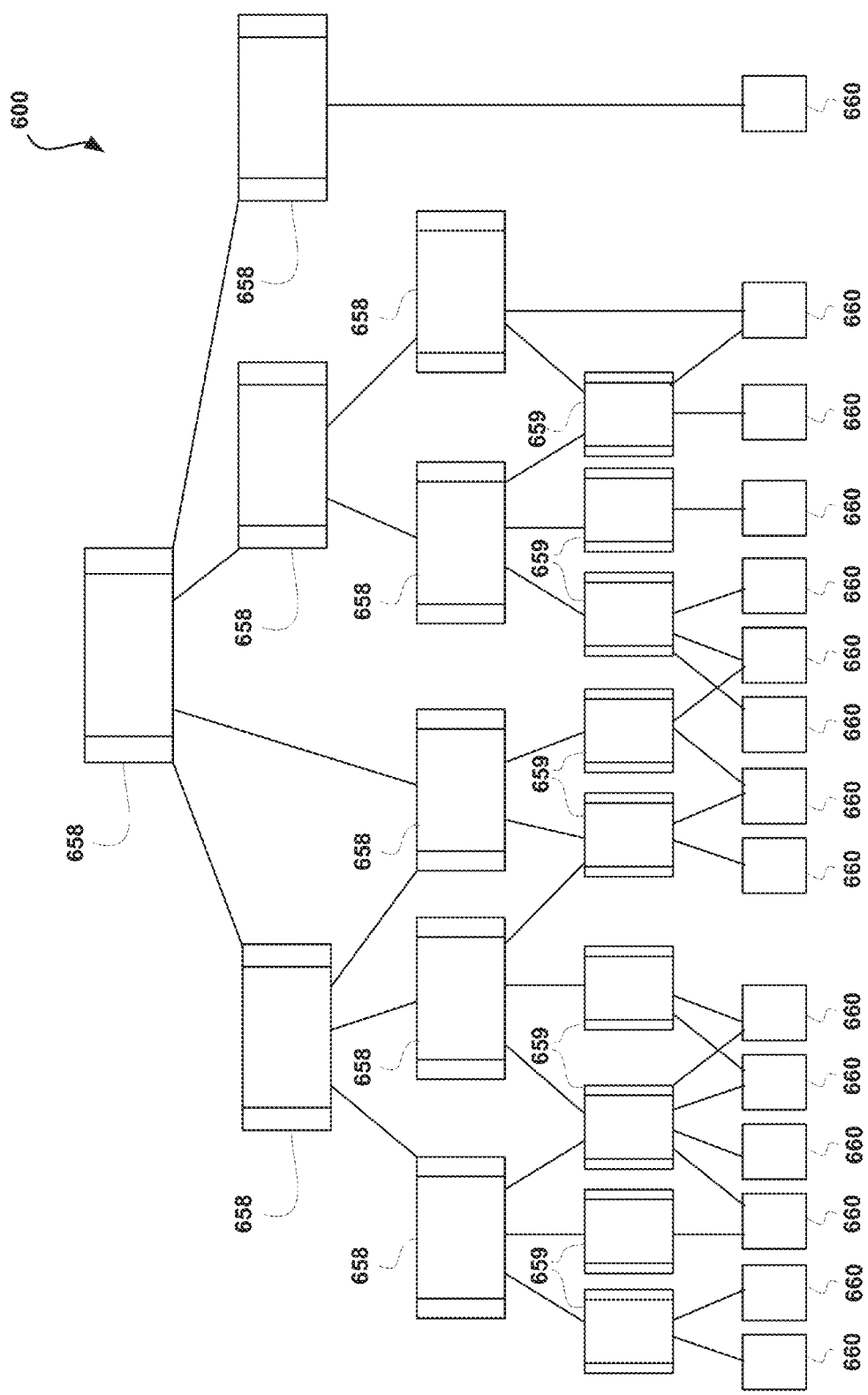
FIG. 6 illustrates a simplified diagram of a distributed deployment of an NFV-MANO (Management and Orchestration), in accordance with one embodiment.

FIG. 6 illustrates a simplified diagram 600 of a distributed deployment of an NFV-O, in accordance with one embodiment. As an option, the diagram 600 may be viewed in the context of the details of the previous Figures. For example, in one embodiment, the distributed deployment of the NFV-O may represent the NFV-based networks and associated elements described in the context of the previous Figures. Of course, however, the diagram 600 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 658 and a leaf component 659. The NFV-O core component 658 can be a child of another core component 658, and/or a parent of one or more core components 658 or leaf components 659. A leaf component 659 cannot be a parent of a core component 658 or a leaf component 659.

Orchestration parameters managed by a particular leaf component 659 or core component 658 may be reported in real-time to the supervising (parent) core component 658. In addition to the supervision, this continuous updating process enables the supervising component to provide backup, and/or support recovery processes associated with hardware and/or software faults as well as security faults and/or breeches.

To provide redundancy, a leaf component 659 may be supervised by two or more core components 658, and child core components 658 may be supervised by two or more parent core components 658. The orchestration parameters managed by a particular core component 658 or leaf component 659 may also be mirrored to the backup core components 658. Optionally, the NFV-O core components 658 may have the same fully functional orchestration capabilities, while leaf components may be limited to simple, well defined and localized sub-orchestration tasks, and thus may provide a faster response to demands and changing load.

A cloud management system (CMS) 660 is a software package managing one or more hardware units operating one or more VNFs and executing one or more VNF instances. A CMS 660 can be managed by one or more leaf components 659 or core components 658, or combinations thereof. A CMS 660 can be located in the operator's premises or in the customer's premises or partly in both.

An NFV-O component such as a core components 658 or a leaf component 659 typically orchestrates a particular, predefined, territory. The territory may be one or more cloud management systems 660, one or more services, one or more customers, etc. Therefore, there can be an overlap between territories of different NFV-O components. For example, one NFV-O component may orchestrate a CMS 660, another NFV-O component may orchestrate a service that is at least partly provided by the same CMS 660, and additionally a third NFV-O component may orchestrate services for a particular customer connected to that same CMS 660.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 659 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 658 or leaf components 659 it supervises. Thus, such parent core component 658 may perform deployment optimization in terms of requirements and load values applied to whole subordinate (child) core components 658 or leaf components 659.

A customer may use the services of several telecom operators. For example, the customer may be an international company operating in several countries. Such a customer usually establishes a virtual private network (VPN)

across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and a chain optimization module) of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

Figure 7:
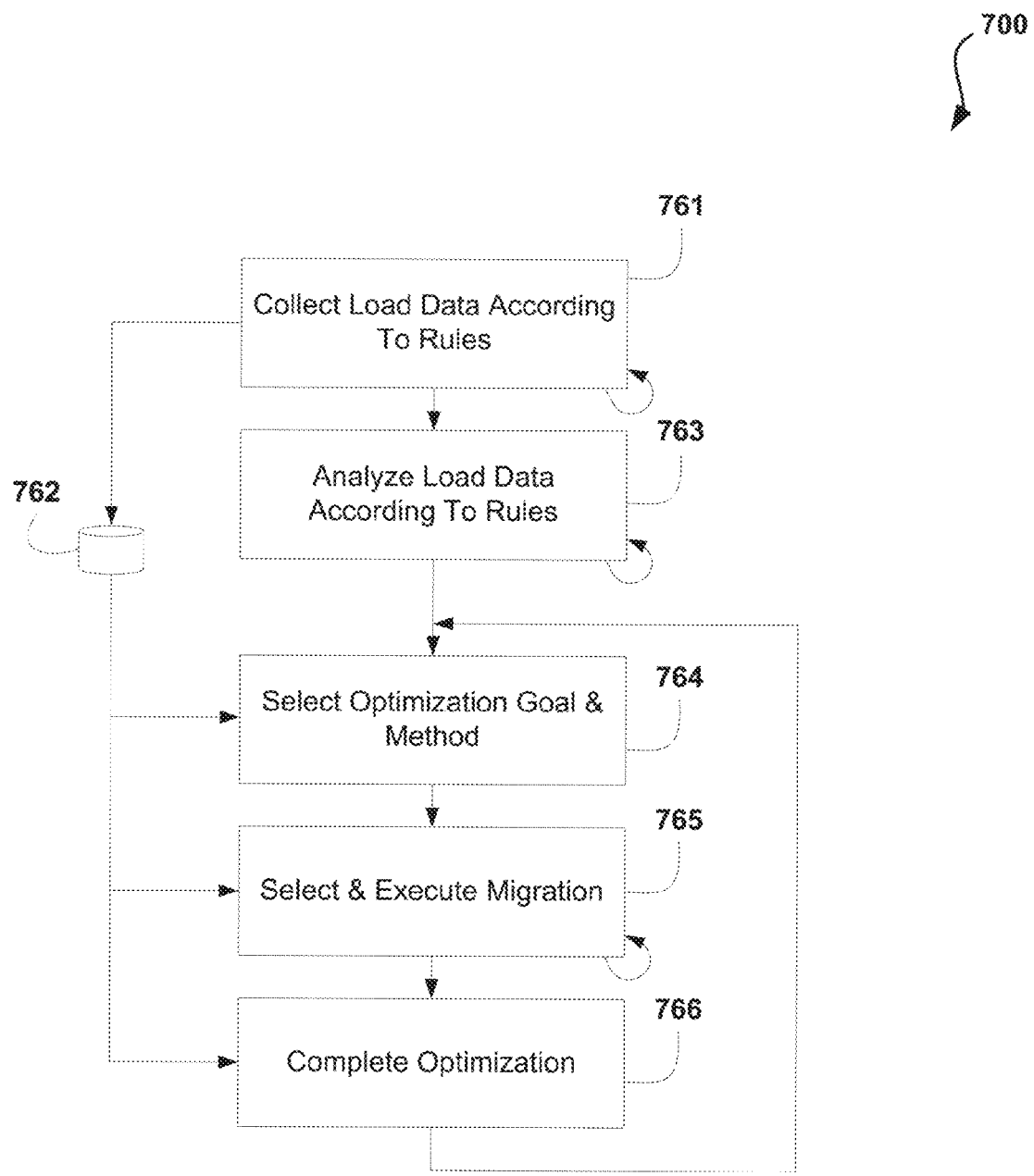
FIG. 7 illustrates a simplified flow chart of a computing process executing NFV deployment module, in accordance with one embodiment.

FIG. 7 illustrates a simplified flow chart 700 of a computing process executing a deployment optimization module, in accordance with one embodiment. As an option, the flow chart 700 may be viewed in the context of the details of the previous Figures. Of course, however, the flow chart 700 be viewed in the context of any desired environment. Further, the aforementioned definitions may equally apply to the description below.

According to the embodiment shown in FIG. 7, process 700 starts in step 661 by loading operational parameters such as SLA, QoS, and QoE (quality of experience), and collecting load data. Operational parameters are updated frequently and load data is changing continuously, therefore step 761 is executed continuously or repeatedly to maintain updated parameters and data.

Load data is collected for each of hardware unit and each software unit. According to one embodiment, load data may include computing load data, transmission load data, energy load data, etc. Computing load data may include, but is not limited to processing load, memory usage, storage consumption, etc. Transmission load data may include, but is not limited to traffic load, latency data, lost packet rate, bit error rate, etc., as well as other parameters representing the quality of the services rendered. Energy load data may include, but is not limited to electricity consumption, heat dissipation, temperature data, cooling and ventilation load, etc.

Load data is collected according to rules stored in and loaded from memory or storage 762. Load collection rules determine, for example, the rate in which load values are measured, and/or the conditions by which each load data is reported, such as reporting a load upon the load crossing a threshold. Load collection rules may be configured by a user such as a network administrator. According to one embodiment, step 761 is processed continuously providing continuously updated load data via memory or storage 762.

The process 700 proceeds to step 763 to analyze the collected load data. According to one embodiment, load analysis is performed according to rules stored in and loaded from memory or storage 762. Load analysis rules may be configured by a user such as a network administrator.

Rules for analyzing load may include, but are not limited to: algorithms for calculating change, or rate of change, of the various types of loads as measured within a predetermined period; algorithms for predicting change, or rate of change, of the various types of load within a predetermined period; algorithms for calculating correlations between various types of load within a predetermined period; algorithms for calculating cost (e.g. cost of energy), including alternative costing schemes, for various types of load within a predetermined period; algorithms for ordering and/or sorting hardware units, and/or processes, and according to load values as collected, calculated and described above (such load values may be, but are not limited to, absolute values, relative values such as a percentage of a maximum permitted load, relative to a predetermined threshold value, etc.); and algorithms for calculating and determining the priority by which optimization processes should be implemented regarding various hardware units and software processes.

Assessing load conditions, including load peaks and threats, and their respective priorities, may also involve their respective services. Some services may have a higher or a lower priority. Such services may include, but are not limited to: streaming (voice, video) and non-streaming; call, messaging, store and forward; simplex (e.g. surveillance), duplex (e.g. telephone call), multiplex (e.g. conference call); broadcast, multicast, unicast (e.g. video on demand (VoD)); download, upload; landline, cellular, satellite communication, cable television; voice, video, multimedia, image, data; compression (conversion); and security issues, firewall, and encryption.

Assessing load conditions and their priority may also involve their respective service level agreements (SLA) and similar commitments.

The process 700 proceeds to step 764 to determine one or more optimization goals and to select an optimization method.

An optimization goal may be, for example, reducing a particular load, such as processing load or latency, of a particular hardware unit or transmission line, below a particular value, such as a predefined threshold. The optimization may have a group of goals involving a plurality of load types and/or hardware units, and or transmission lines. Furthermore, the optimization may have goals set as limitations. For example, moving processing load or storage from one hardware unit to another may increase traffic or latency, and the optimization goal limits such increase.

Another type of optimization goal is associated with cost reduction, such as by saving energy. For example by shutting down one or more hardware units and/or associated support facilities such as cooling and ventilation. Alternatively, cost reduction may be achieved by moving the consumption to a location where, for example, energy is less costly. For example, moving VNF instances to hardware units located in a region where the cost of electricity is lower, such as night saving electricity price plan. Similarly cost reduction can be achieved by migrating the processing to a site using natural cooling (e.g. naturally cold water). The process 700, particularly in step 764, may set a cost saving goal in which available transmission capacity is used to utilize as much of the processing capacity of hardware units located where the cost of electricity is lowest for the period considered.

It is noted that optimization may involve redistribution, or redeployment, of VNF instances so that particular VNF instances are grouped on a particular hardware unit because, for example, these VNF instances have the same, or, different, or complementary, load requirements. For example, a VNF instance having high processing requirement and a low storage requirement is grouped with a VNF instance having the opposite requirements (e.g., low processing and high storage). Similarly, VNF instances having instantaneous peak load are grouped with VNF instances having complementary load behavior.

An optimization method typically involves redistribution of the VNF instances among the hardware units. Optimization methods may be, for example, moving a VNF instance from one hardware unit to another up or down the network hierarchy, and/or moving a VNF instance from one hardware unit to another at the same hierarchy level. According to one embodiment, moving a VNF instance at the same hierarchy level may be implemented by joining the load, or service provided by two or more VNF instances executed by a different hardware unit at the same level, for example to enable shutdown of one or more hardware units. According to another embodiment, moving a VNF instance at the same hierarchy level may be implemented by splitting the load (or service provided by) a VNF instance between two or more hardware units. According to one embodiment, if step 764 sets a plurality of optimization goals, the optimization goals are ordered, and/or prioritized.

When determining the optimization goals and method, the process 700, particularly in step 764, may use rules to evaluate and determine resource conversion. Resource conversion applies to the trading of the availability of one type of resource to replace a shortage of another type of resource. For example, suppose that the processing load in a first hardware unit is nearing the maximum capacity, and that there is available transmission capacity between the first hardware unit and a second hardware unit. Thus, migrating a VNF instance from the first hardware unit to the second hardware unit converts the available transmission capacity into an available processing capacity in the first hardware unit.

Similarly, if the traffic load between the first hardware unit and the second hardware unit nears the maximum transmission capacity, a VNF instance may be migrated from the second hardware unit to the first hardware unit, thus converting the processing power available in the first hardware unit into transmission capacity to the second hardware unit.

Resource conversion may be applied to, or between, any two or more resources, including processing power, memory, storage, and transmission, as well as energy, electricity, cooling, etc.

When determining the optimization goals and method, the process 700, particularly in step 764, may use rules to evaluate and determine between various optimization options. For example, considering the cost of migrating VNF instance between hardware units. It is appreciated that a migrating activity typically requires an additional processing activity, an additional transmission activity, an additional memory and storage load, etc. Therefore, the migration activity involves some cost in increased processing load, increased traffic load, etc. Such added load may also affect energy consumption, electricity and cooling. Such added loads may also have monetary values. The process 700, particularly in step 764, may use rules to evaluate and determine the worthiness, and/or the profitability, of a particular migration activity and method with respect to the anticipated gains and savings.

Eventually, step 764 provides one or more optimization goals, one or more optimization methods, and one or more VNF instances to be redistributed (e.g., migrated to other hardware units). Typically the VNF instances are ordered, for example, by priority, or by their expected influence on the results of the optimization process.

The process 700 proceeds to step 765 to select and execute migration of VNF instances to accomplish the optimization goals as set in step 764. It is appreciated that executing or implementing the optimized deployment, or changes to the deployment plan, are typically performed by the orchestration and workflow management. However, for simplicity of the description, the execution is presented here as part of the process 700.

In step 765 process 700 selects a VNF instance from the list provided by step 764, selects a migration method for that VNF instance, which is compatible with the optimization method as determined by process 764, and executes the selected migration method. Selecting a migration method may include, for example, selecting the hardware unit to which the VNF instance should be migrated. Step 765 repeats for all the VNF instances listed by step 764.

The process 700 then proceeds to step 766 to complete the optimization process. Steps 764, 765, and 766 are repeated until achieving the goals set by step 764. However, step 764 may change the goals according to the results of the optimization process, or because of external developments, as load data is collected by step 661 and analyzed by step 763. Step 766 may end, for example, by an instruction to shut down a particular computing facility and/or associated support facilities (such as cooling and ventilation).

It is noted that therefore the optimization process 700 is an ongoing, continuous, or repetitive, process, enabling continuous, or frequent, optimization, in real-time.

Figure 8:
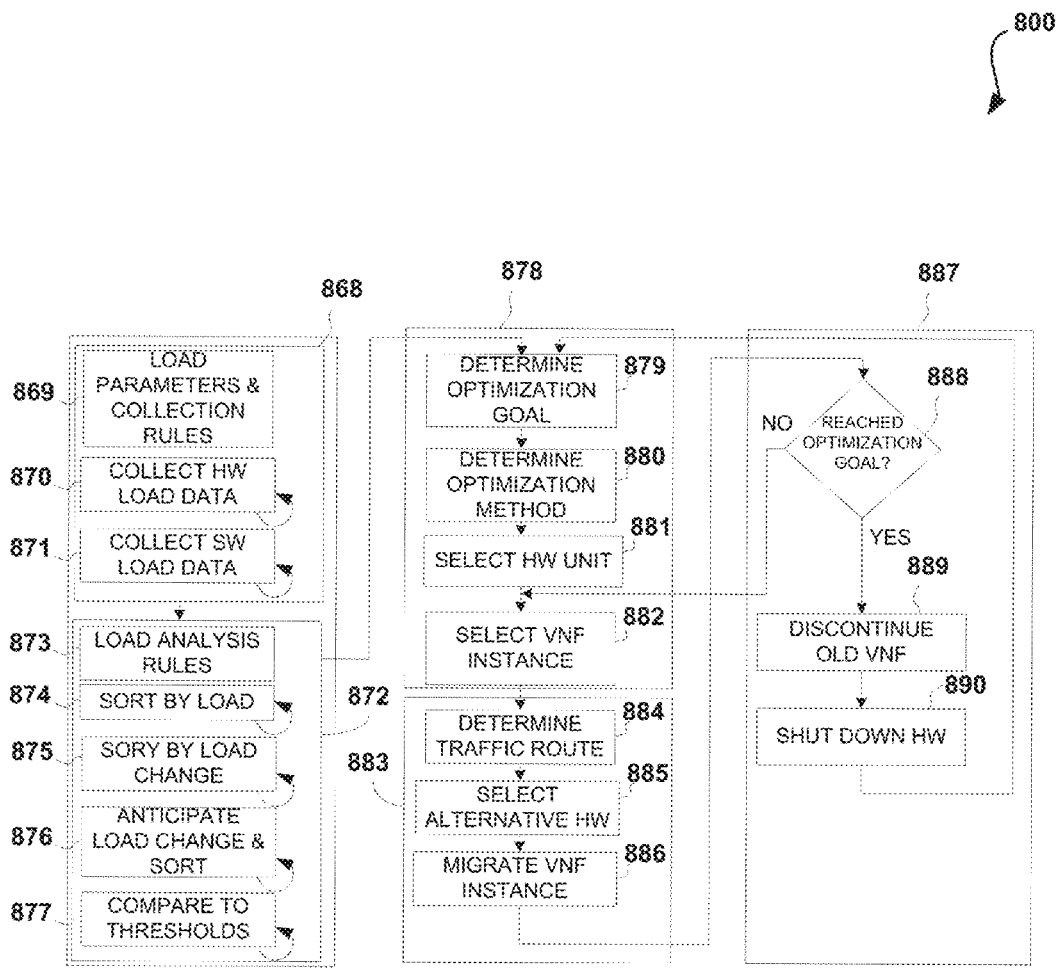
FIG. 8 illustrates a simplified flow chart of a computing process executing NFV deployment module, in accordance with one embodiment.

FIG. 8 illustrates a simplified flow chart 800 of a computing process executing a deployment optimization module, in accordance with one embodiment. As an option, the flow chart 800 may be viewed in the context of the details of the previous Figures. Of course, however, the flow chart 800 be viewed in the context of any desired environment. Further, the aforementioned definitions may equally apply to the description below.

The process 800 starts with step 868, which is a more detailed implementation of step 761 of FIG. 7. Step 868 includes step 869 that loads operational parameters and loads collection rules. Load collection rules indicates how and when to collect load data from hardware units and software modules of the NFV-based network. Using these collection rules, steps 870 and 871 collect load hardware and software values, respectively. Steps 870 and 871 collect load values continuously or repetitively providing updated load values. It is appreciated that the operational parameters and load collection rules may be updated too, continuously and/or repetitively, automatically and/or manually.

The process 800 proceeds with step 872, which is a more detailed implementation of step 763 of FIG. 7. Step 872 includes step 873 in which load analysis rules are loaded. Using these analysis rules steps 874, 875, 876 and 877 analyze the load values collected by step 868. Step 874 computes and compares absolute or relative (percentage) load values and orders their respective hardware and/or software (VNF) instances according to these values. Step 875 computes and compares the changes in the absolute or relative (percentage) load values per a unit of time and orders their respective hardware and/or software (VNF) instances according to these values. Step 876 anticipates and computes changes in the absolute or relative (percentage) load values for a predetermined point in time in the future, and orders their respective hardware and/or software (VNF) instances according to these values. Step 877 computes any of the values computed by steps 874, 875 and/or 876 with respective predefined thresholds, and orders their respective hardware and/or software (VNF) instances according to these comparisons. Steps 874, 875, 876 and 877 are executed continuously or repetitively providing updated load analysis values.

The process 800 proceeds to step 878, which is a more detailed implementation of step 764 of FIG. 7. Step 878 includes various steps. In step 879 the process 800 determines and prioritizes optimization goals. For example, step 879 may elect to balance traffic loads according to current relative load values (percentage of local maxima), or to balance processing loads according to anticipated load values, or to balance memory loads according to their respective thresholds, or to save energy by turning off least active computing facilities.

In step 880 the process 800 selects one or more optimization methods, such as moving load up the hierarchy, or down the hierarchy, to a less loaded computing facility, or splitting a load between two or more processing facilities, or evacuating load from a particular computing facility to enable shutdown.

In steps 881 and 882 the process 800 selects a (first) computing facility, and within that (first) computing facility (e.g., a hardware unit) a particular (first) software unit (e.g., VNF instance).

The process 800 proceeds to step 883, which is a more detailed implementation of step 765 of FIG. 7. Step 883 performs various steps. In step 884 the process 800 selects a traffic route, or link, from the (first) computing facility (e.g., a hardware unit) selected in step 881, along which an alternative computing facility (e.g., a hardware unit) is sought.

A traffic route may include one or more hardware units and/or transmission links via which a VNF instance provides a service. For example, hardware units and/or transmission link located between a VNF instance and a terminal device (user terminal or a server) the VNF instance services. A traffic route may include one or more hardware units and/or transmission links located away from the terminal device. In this case, the current VNF instance is located between the traffic route and the terminal device. For example, a traffic route may include hardware units and/or transmission link located between a VNF instances forming a service chain (e.g. a chain of VNF instances).

In step 885 the process 800 selects a (second) computing facility (e.g., a hardware unit) along the traffic route selected in step 884, the selected computing facility being compatible with the needs of the VNF instance selected in step 882, and with the optimization goals and methods selected in steps 879 and 880.

The process 800 then proceeds to step 886 to migrate the VNF instance selected by step 882, in whole or in part (e.g., load splitting) from the (first) computing facility (e.g., a hardware unit) selected in step 881 to the (second) computing facility selected in step 885.

The process 800 proceeds to step 887, which is a more detailed implementation of step 766 of FIG. 7. In step 888 the process 800 verifies that the optimization goals, as determined in step 879, are met. If the optimization goals are not met then the process 800 continues with another software module (VNF instance). If the optimization goals are accomplished then the process 800 continues to steps 889 and/or 8903, to discontinue the VNF instance in the first computing facility and/or shut down the first computing facility, in accordance with the optimization method as determined in step 880.

The process 800 performs steps 878, 883 and 888 or 887 continuously or repeatedly according to the load analysis continuously or repeatedly provided by steps 868 and 872.

Figure 9:
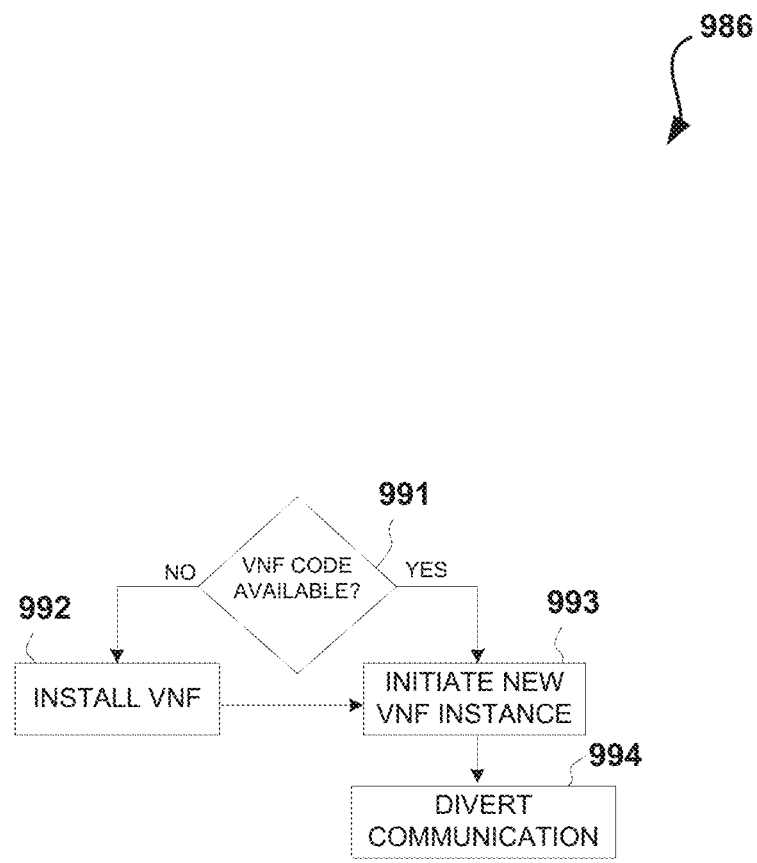
FIG. 9 illustrates a simplified flow chart of a routine for migrating a VNF instance, in accordance with one embodiment.

FIG. 9 illustrates a simplified flow chart 986 of a routine for migrating a VNF instance as disclosed above in step 886 of FIG. 8, in accordance with one embodiment. As an option, the flow chart 986 may be viewed in the context of the details of the previous Figures. Of course, however, the flow chart 986 be viewed in the context of any desired environment. Further, the aforementioned definitions may equally apply to the description below.

The VNF migrating routine of flow chart 986 starts with step 991 to determine if the required VNF code exists in the target hardware unit (the second computing facility of step 885 of FIG. 8). If the required VNF does not exist in the target hardware unit the VNF migrating routine of flow chart 986 proceeds to step 992 to install the required VNF in the target hardware unit. The VNF migrating routine of flow chart 986 then proceeds to step 993 to initiate in the target hardware unit a VNF instance and configure it according to the parameters of the VNF instance of the first hardware unit. The VNF migrating routine of flow chart 986 then proceeds to step 994 to divert all or part of the communication incoming to the VNF instance of the first hardware unit to the VNF instance of the target (second) hardware unit.

More information regarding possible processes for migrating one or more VNF instance may be found in U.S. Provisional Patent Application No. 61/918,597, titled "System, Method, And Computer Program For Preserving Service Continuity In A Network Function Virtualization (NFV) Based Communication Network", and U.S. patent application Ser. No. 14/572,716, now issued U.S. Pat. No. 9,384,028, titled "System, Method, And Computer Program For Preserving Service Continuity In A Network Function Virtualization (NFV) Based Communication Network", which are incorporated by reference herein in their entirety.

It is appreciated that the contents of these two US patent applications may form at least a part of a possible embodiment of step 886 of process 800 as described with reference to FIG. 8. It is appreciated that FIGS. 11 and 12 of U.S. patent application Ser. No. 14/572,716, now issued U.S. Pat. No. 9,384,028, titled "System, Method, And Computer Program For Preserving Service Continuity In A Network Function Virtualization (NFV) Based Communication Network" as well as their respective description, may be used instead of, or in addition to, FIG. 9 herein.

It is appreciated that the fundamental optimizing process may include: selecting a first VNF instance from a first hardware having a highest load of a particular load type; identifying at least one traffic route in which the VNF instance participates in a service provided to a user; selecting a second hardware unit into which the VNF instance would be migrated, this second hardware unit being located along one of the traffic route identified in the previous step, provided that the second hardware unit has a load lower than the first hardware unit; and initiating a (second) VNF instance, compatible with the first VNF instance, in the second hardware unit; and migrating the service from the first VNF instance to the second VNF instance, preferably without disrupting the service.

In optimizing an NFV-based network the deployment optimization module may use the following types of rules: rules for collecting load parameters; rules for analyzing load parameters; migration rules; migration prioritizing rules; rules for selecting a migration process; rules for selecting hardware for evacuation and shut-down; rules for deploying stand-by VNFs; rules for determining which VNF instances should be moved from the processing device or network (transmission) link approaching overload; rules for determining where to move the VNF instances, based on their availability and the anticipated growth of loads (processing, memory, storage, and traffic) in these devices and their associated network links, including cost considerations; rules for determining priorities of migration processes; rules for selecting a migration process (if more than one process is available); rules for deploying VNF modules to processors, ahead of their activation, to save the need to download the module before migrating a VNF instance to the target processor; and rules for evacuating one or more processors to enable their shut-down to save electric power consumption, wear, maintenance, etc.

Load parameters may include, but are not limited to processing loads, memory loads, storage consumption, and traffic loads. Analyzing load parameters may include detecting, predicting and/or analyzing load parameters. Load parameters may also include load values, load growth, anticipated load and/or anticipated load growth. Analyzing load behavior may include, but is not limited to, comparing any of the load parameters, or combinations thereof, with predefined thresholds.

It is appreciated that dynamic (real-time) optimization of an NFV-based network includes cost considerations. For a regular network operator the costing of operating the network is based on the configuration (topology, deployment) of the hardware elements (whether used or not). The optimal configuration simply uses less hardware (or less expensive hardware elements). A virtual network operators (VNO) may pay for hardware used (rather than hardware deployed). The cost consideration of a virtual network operators may therefore be different from the cost consideration of a regular network operator.

It is appreciated that certain features of the embodiments described herein may also be provided in combination in a single embodiment. Conversely, various features of the invention, which are, for brevity, described in the context of a single embodiment, may also be provided separately or in any suitable sub-combination.

Figure 10:
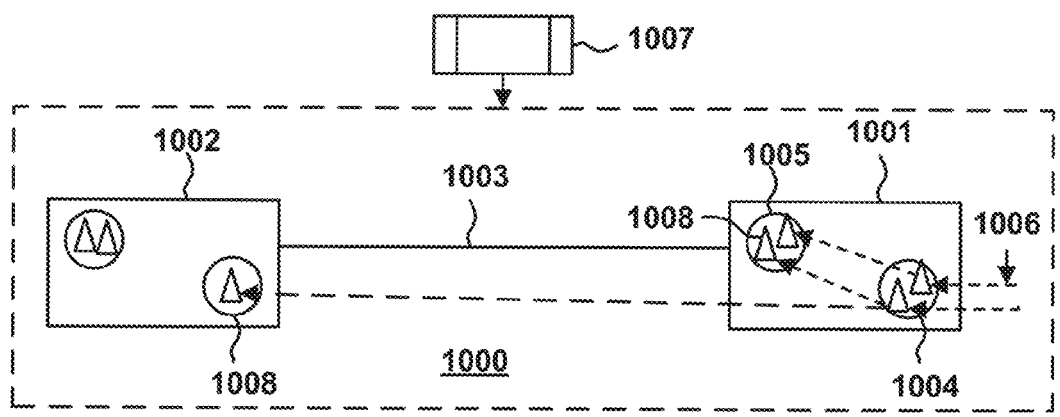
FIG. 10 illustrates a simplified block diagram of a resource conversion process, in accordance with one embodiment.

FIG. 10 illustrates a simplified block diagram 1000 of a resource conversion process, in accordance with one possible embodiment. As an option, the block diagram 1000 may be viewed in the context of the details of the previous Figures. Of course, however, the block diagram 1000 be viewed in the context of any desired environment. Further, the aforementioned definitions may equally apply to the description below.

As shown in FIG. 10, hardware units 1001 and 1002 are interconnected by a communication link 1003. Hardware units 1001 and 1002 may include resources such as processing power, memory capacity, storage capacity, electrical power supplies, cooling capacity, etc. Communication link 1003 may also have resource capacities such as bandwidth, jitter, etc. As shown in FIG. 10, hardware units 1001 and 1002 host VNFs designated as circles, which are instantiated as VNF instances designated as triangles within the respective VNFs.

As shown in FIG. 10 instances of VNF 1004 and 1005 provide a service 1006. In the example of resource conversion shown in FIG. 10 the load on service 1006 grows and therefore instances of VNF 1005 incur low availability of a particular resource such as processing power, memory capacity, storage capacity, etc.

An NFV-O module or process 1007, which manages the hardware units 1001, 1002 and communication link 1003 and/or the instances of VNFs 1004 and 1005 and/or service 1006 identifies the lack of sufficient availability of the particular resource, for example, hardware unit 1001 lack sufficient processing power required by at least one instance of VNF 1005. NFV-O module or process 1007 therefore executes resource conversion to resolve this problem.

NFV-O module or process 1007 may execute resource conversion, for example, by trading surplus bandwidth capacity of communication link 1003 with processing power available in an adjacent hardware unit such as hardware unit 1002. NFV-O module or process 1007 then migrates at least one VNF instance 1008 of VNF 1005 to hardware unit 1002. Thereafter instances of VNF 1004 may communicate via communication link 1003 with the migrated VNF instance 1008 in hardware unit 1002.

Figure 11:
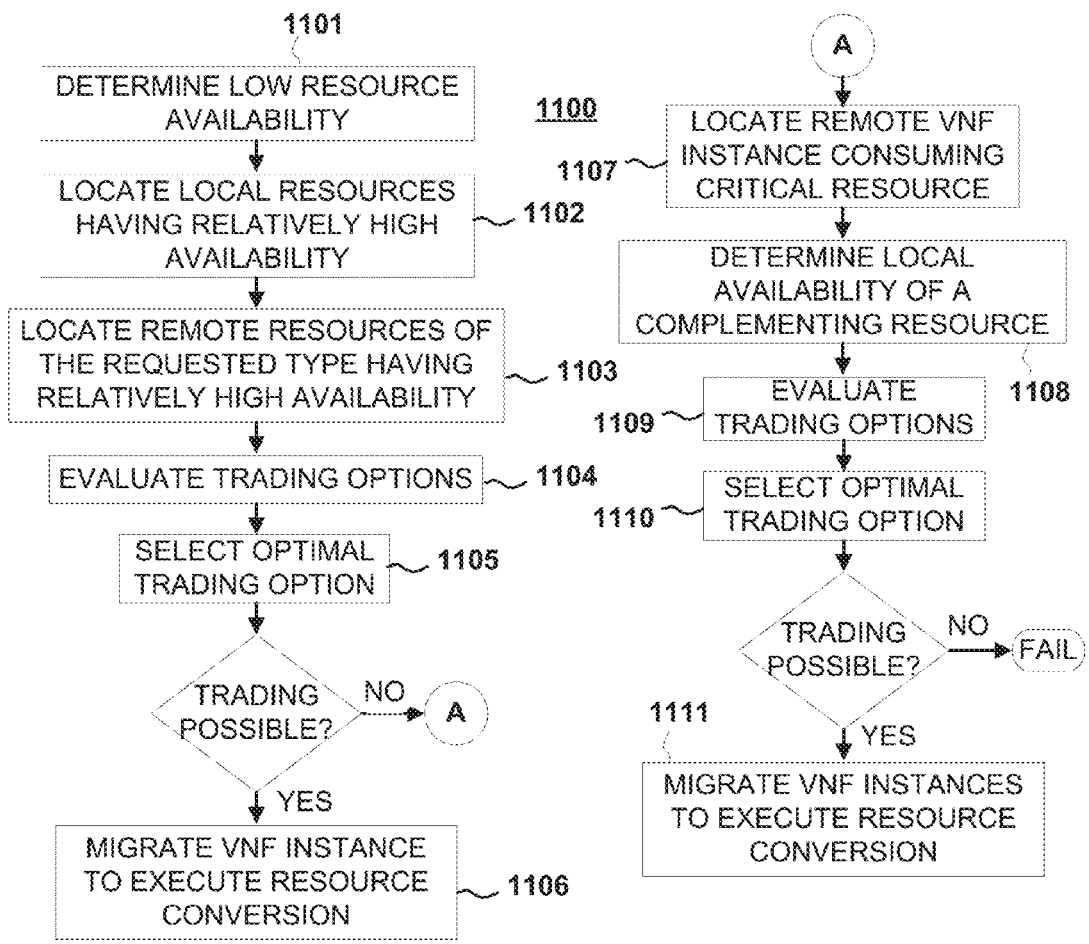
FIG. 11 illustrates a simplified flow chart of a resource conversion process, in accordance with one embodiment.

FIG. 11 illustrates a simplified flow chart of a resource conversion process 1100, in accordance with one possible embodiment. As an option, the flow chart may be viewed in the context of the details of the previous Figures. Of course, however, the flow chart be viewed in the context of any desired environment. Further, the aforementioned definitions may equally apply to the description below. Resource conversion process 1100 may be executed, for example, by NFV-O module 1007 of FIG. 10.

As shown in FIG. 11, resource conversion process 1100 may start with step 1101, in which resource conversion process 1100 may determine low availability of a particular resource (low availability, or scarce resource) in a particular first hardware unit, associated with a requirement of one or more particular processes, such as one or more VNF instances operating in association with the particular hardware unit. Considering the example shown and described with reference to FIG. 10, the scarce resource may be processing power.

Resource conversion process 1100 may then proceed to step 1102 to locate one or more local resources, which are of the same type of the resource associated with the particular first hardware unit, and where these local resources have a relatively high availability, or surplus capacity. Considering the example shown and described with reference to FIG. 10, the local resource may be the communication bandwidth with one or more adjacent hardware units.

Resource conversion process 1100 may then proceed to step 1103 to locate one or more remote resources, which are of the same type of the scarce resource, which are associated with one or more adjacent hardware units, and where these remote resources have a relatively high availability, or surplus capacity.

Resource conversion process 1100 may then proceed to step 1104 to evaluate options for trading a local resource with a remote resource to resolve the low availability condition.

Resource conversion process 1100 may then proceed to step 1105 to select one of the trading options, such as a trading option that is considered optimal according to one or more evaluation rules.

If trading is possible, the resource conversion process 1100 may proceed to step 1106 to complete the resource conversion process by migrating one or more VNF instances to the selected second (adjacent) hardware unit.

If trading is not possible, the resource conversion process 1100 may proceed to step 1107 to locate one or more VNF instances operating in an adjacent hardware unit (remote VNF instances), which are consuming a critical resource. Considering the example shown and described with reference to FIG. 10, the critical resource may be the communication bandwidth. In this respect, resource conversion process 1100 seeks remote VNF instances that have a relatively high consumption of the critical resource and a relatively low consumption of the scarce resource.

Resource conversion process 1100 may then proceed to step 1108 to determine that the local hardware unit can support the remote VNF instance. Namely that all the complementing resources required by the remote VNF instance are available in the local hardware unit.

Resource conversion process 1100 may then proceed to steps 1109 and 1110 to evaluate the trading options and select the optimal trading option. If trading is possible resource conversion process 1100 may proceed to step 1111 to execute the resource conversion by migrating the remote VNF instance from the remote hardware unit to the local hardware unit, and then migrating the local VNF from the local hardware unit to the remote hardware unit.

It is appreciated that resource conversion may include any number of resources and/or VNF instances. For example, a first VNF instance hosted in a first hardware unit is migrated to a second hardware unit to release storage capacity to enable migration of a second VNF instance hosted in a second hardware unit. The second VNF instance is then migrated from the second hardware unit to the first hardware unit to release processing power in the second hardware unit, thus converting available storage capacity into available processing power. A third VNF instance, which hosted in a third hardware unit and in demand for additional processing power, is then migrated from to the third hardware unit to the second hardware unit, thus converting available bandwidth capacity between the third and second hardware units into available processing power. It is appreciated that such process may include any number of hardware units, VNF instances, and resources. For example, instead of the single first VNF instance such process may include two or more VNF instances migrated from the first hardware unit.

It is appreciated that a chain conversion as described above may be performed among within any configuration and/or topology of a group of hardware, units, resources and VNF instances. For example, a pair of hardware units may improve availability of their resources by exchanging between themselves two or more VNF instances. Resource conversion may therefore be implemented by exchanging, for example, VNF instances of different types.

Figure 12:
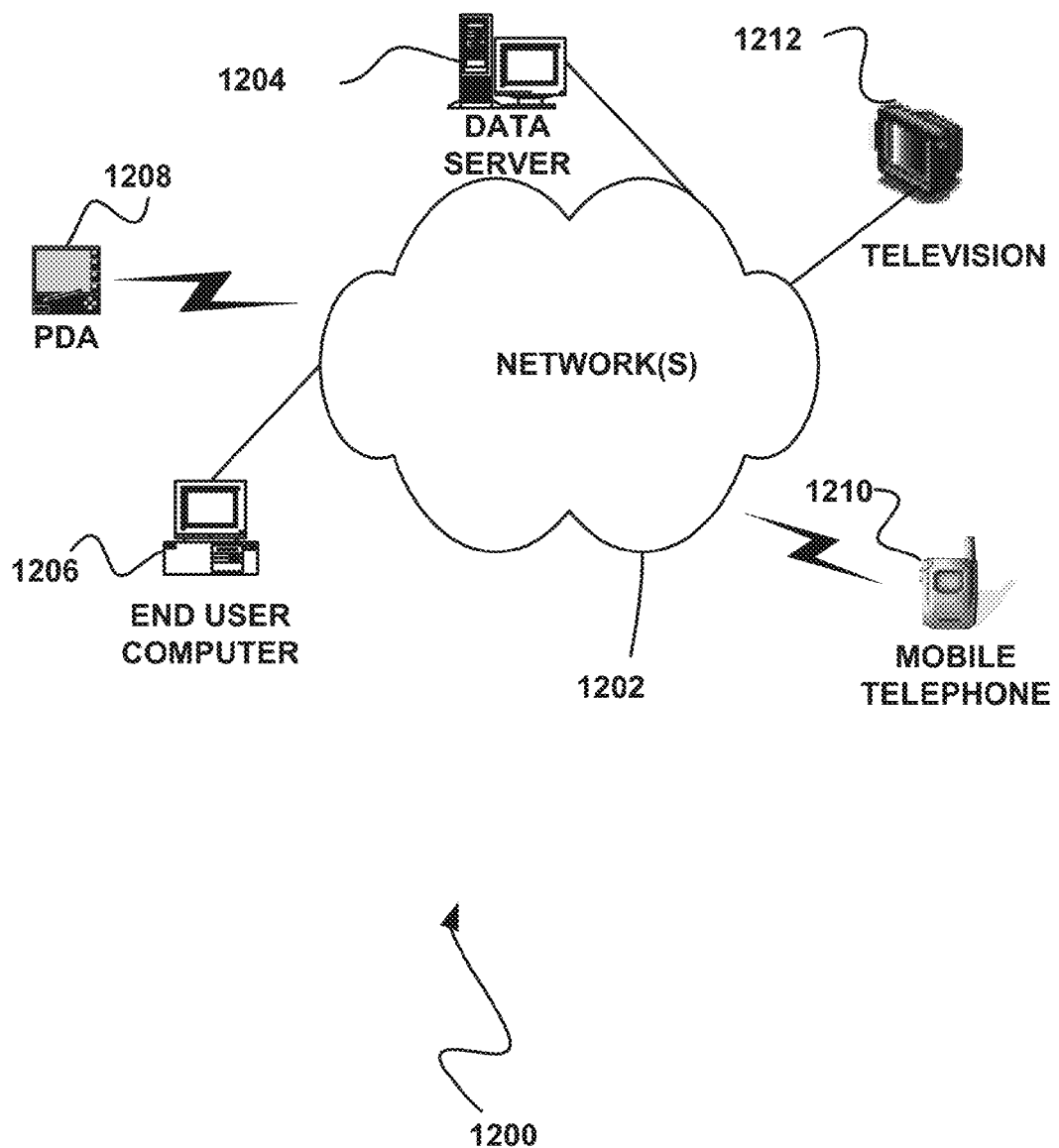
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
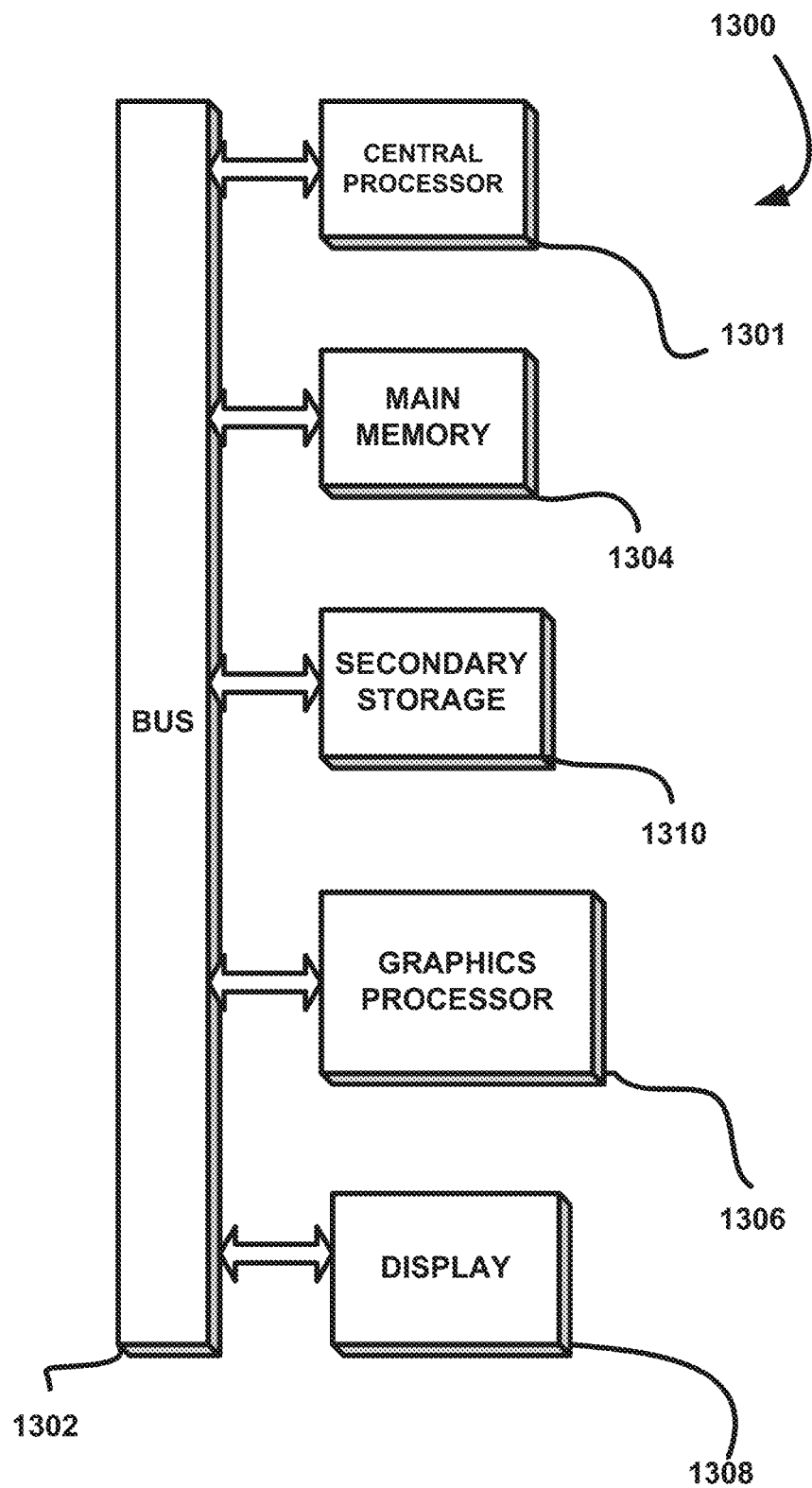
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining, by a computer system, that a first processing power in a first hardware unit is being used by a first virtual network function (VNF) instance of a Network Function Virtualization based (NFV-based) communication network and that the first processing power in the first hardware unit does not meet a required processing power of the first VNF instance;
   in response to the determination that the first processing power in the first hardware unit does not meet the required processing power of the first VNF instance, locating, by the computer system, a first communication link that exists between the first hardware unit and a second hardware unit and that has a surplus bandwidth capacity;
   determining, by the computer system, that a second processing power of the second hardware unit has a surplus capacity;
   determining, by the computer system, that the first processing power is not capable of being traded with the second processing power to resolve the first hardware unit not meeting the required processing power of the first VNF instance;
   in response to determining that the first processing power is not capable of being traded with the second processing power, identifying, by the computer system, a second VNF instance operating in the second hardware unit that is consuming a bandwidth capacity of a second communication link of the second hardware unit;

determining, by the computer system, that all resources required by the second VNF instance are available in the first hardware unit;

determining, by the computer system, that the first processing power is capable of being traded with the bandwidth capacity of the second communication link;

in response to determining that all resources required by the second VNF instance are available in the first hardware unit and that the first processing power is capable of being traded with the bandwidth capacity of the second communication link, migrating, by the computer system, the second VNF instance to the first hardware unit and then migrating the first VNF instance to the second hardware unit, such that after the migration of the second VNF instance the second VNF instance consumes the bandwidth capacity of the first communication link and after the migration of the first VNF instance, the first VNF instance consumes the second processing power of the second hardware unit.

2. A computer program product embodied on a non-transitory computer readable medium, comprising:

computer code for determining, by a computer system, that a first processing power in a first hardware unit is being used by a first virtual network function (VNF) instance of a Network Function Virtualization based (NFV-based) communication network and that the first processing power in the first hardware unit does not meet a required processing power of the first VNF instance;

computer code for, in response to the determination that the first processing power in the first hardware unit does not meet the required processing power of the first VNF instance, locating, by the computer system, a first communication link that exists between the first hardware unit and a second hardware unit and that has a surplus bandwidth capacity;

computer code for determining, by the computer system, that a second processing power of the second hardware unit has a surplus capacity;

computer code for determining, by the computer system, that the first processing power is not capable of being traded with the second processing power to resolve the first hardware unit not meeting the required processing power of the first VNF instance;

computer code for, in response to determining that the first processing power is not capable of being traded with the second processing power, identifying, by the computer system, a second VNF instance operating in the second hardware unit that is consuming a bandwidth capacity of a second communication link of the second hardware unit;

computer code for determining, by the computer system, that all resources required by the second VNF instance are available in the first hardware unit;

determining, by the computer system, that the first processing power is capable of being traded with the bandwidth capacity of the second communication link;

computer code for, in response to determining that all resources required by the second VNF instance are available in the first hardware unit and that the first processing power is capable of being traded with the bandwidth capacity of the second communication link, migrating, by the computer system, the second VNF instance to the first hardware unit and then migrating the first VNF instance to the second hardware unit, such that after the migration of the second VNF instance the second VNF instance consumes the bandwidth capacity of the first communication link and after the migration of the first VNF instance, the first VNF instance consumes the second processing power of the second hardware unit.

3. A system comprising:

a memory system; and one or more processing cores coupled to the memory system and that are each configured to:

determine that a first processing power in a first hardware unit is being used by a first virtual network function (VNF) instance of a Network Function Virtualization based (NFV-based) communication network and that the first processing power in the first hardware unit does not meet a required processing power of the first VNF instance;

in response to the determination that the first processing power in the first hardware unit does not meet the required processing power of the first VNF instance, locate a first communication link that exists between the first hardware unit and a second hardware unit and that has a surplus bandwidth capacity;

determine that a second processing power of the second hardware unit has a surplus capacity;

determine that the first processing power is not capable of being traded with the second processing power to resolve the first hardware unit not meeting the required processing power of the first VNF instance;

in response to determining that the first processing power is not capable of being traded with the second processing power, identify a second VNF instance operating in the second hardware unit that is consuming a bandwidth capacity of a second communication link of the second hardware unit;

determine that all resources required by the second VNF instance are available in the first hardware unit;

determine that the first processing power is capable of being traded with the bandwidth capacity of the second communication link;

in response to determining that all resources required by the second VNF instance are available in the first hardware unit and that the first processing power is capable of being traded with the bandwidth capacity of the second communication link, migrate the second VNF instance to the first hardware unit and then migrating the first VNF instance to the second hardware unit, such that after the migration of the second VNF instance the second VNF instance consumes the bandwidth capacity of the first communication link and after the migration of the first VNF instance, the first VNF instance consumes the second processing power of the second hardware unit.

* * * * *